Figure 1:
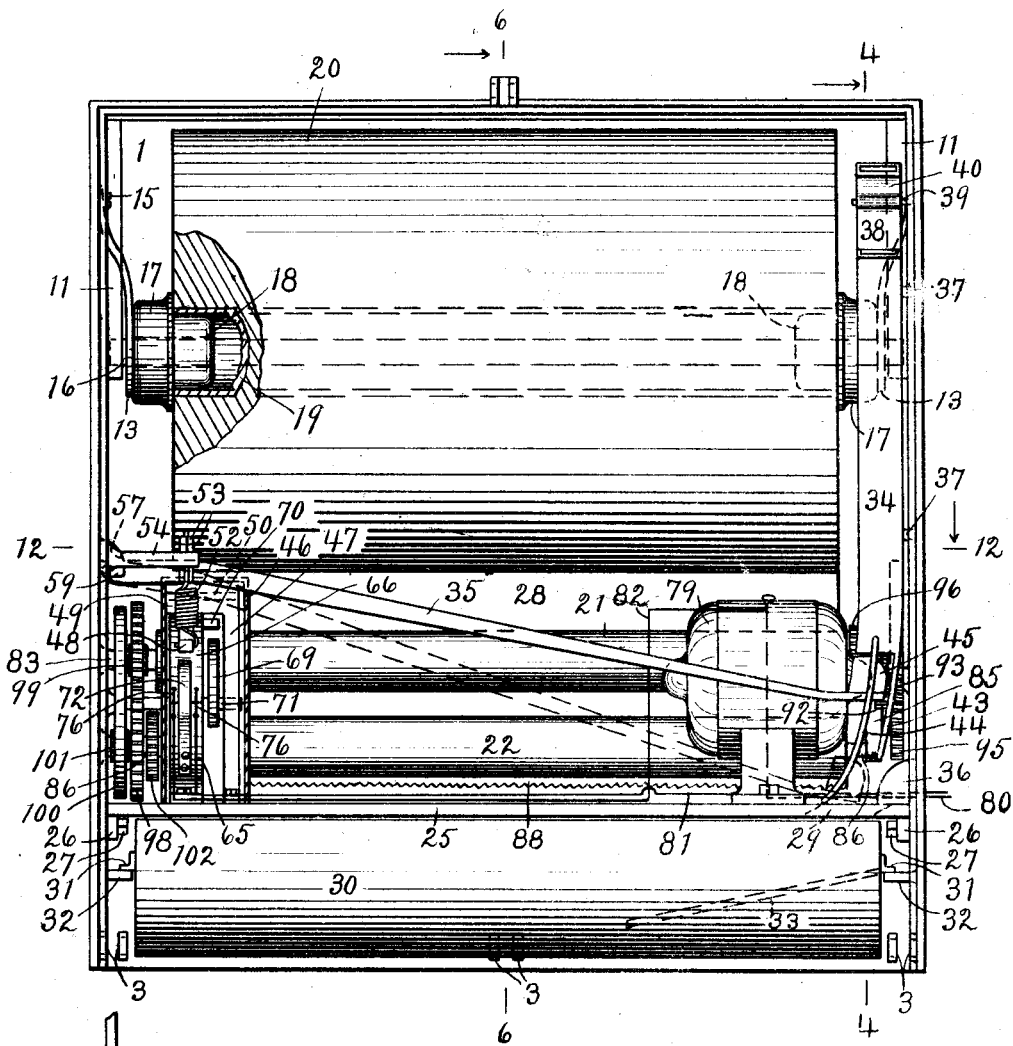

W. L. HAMILTON.
AUTOMATIC VENDING MACHINE.
APPLICATION FILED AUG. 15, 1911.

1,053,912.

Patented Feb. 18, 1913.
4 SHEETS—SHEET 1.

WITNESSES:
A. C. Fairbanks.
J. M. Davenport

INVENTOR.
Walter Loomis Hamilton,
BY
Webster & Co.,
ATTORNEYS.

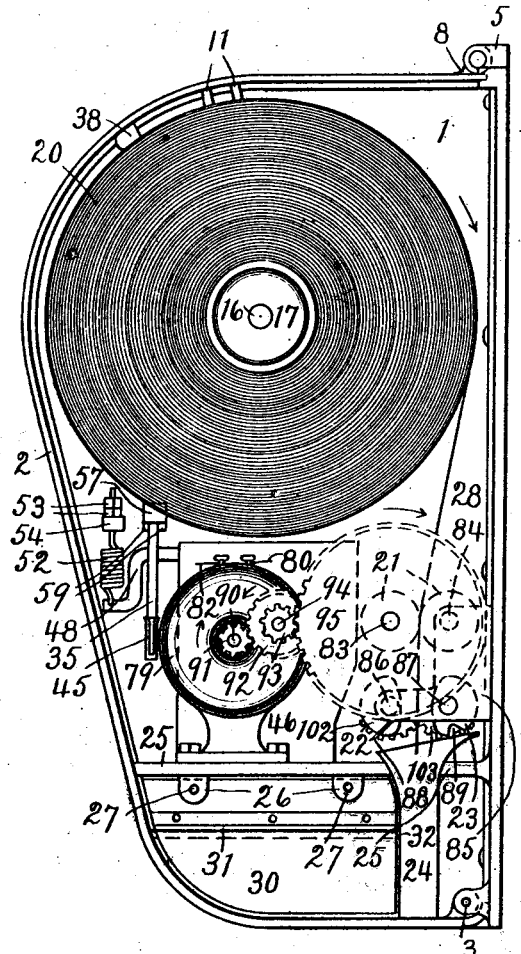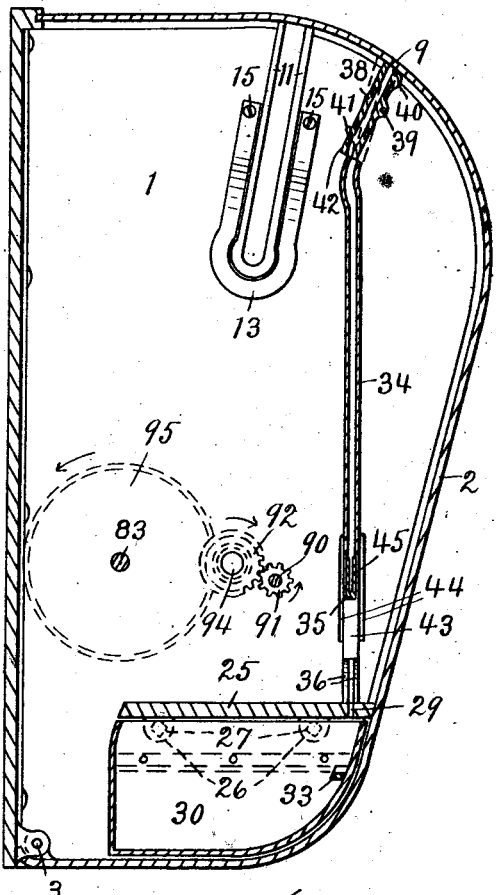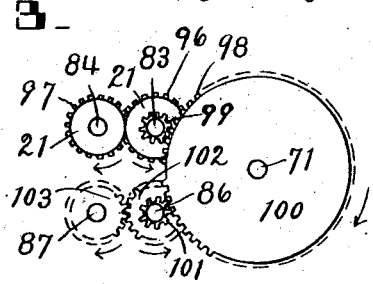

W. L. HAMILTON.
AUTOMATIC VENDING MACHINE.
APPLICATION FILED AUG. 15, 1911.
1,053,912.
Patented Feb. 18, 1913.
4 SHEETS—SHEET 3.
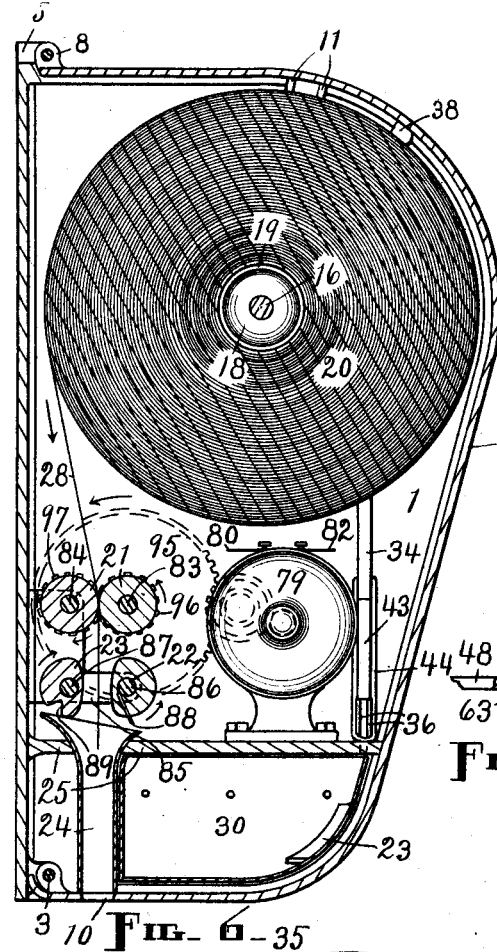
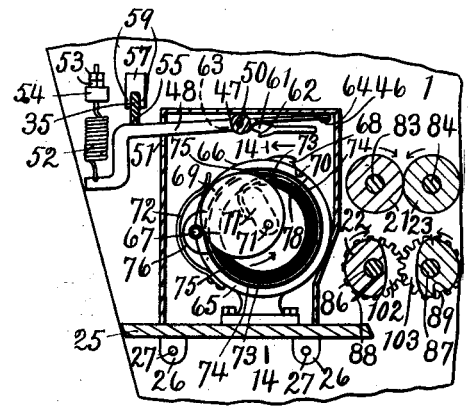
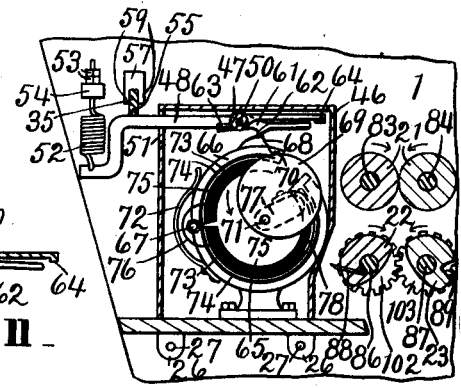
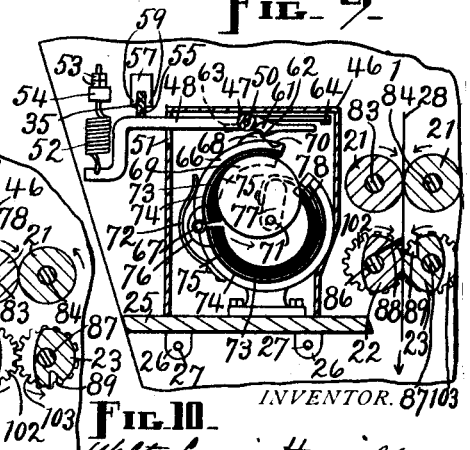
WITNESSES:
A. C. Fairbanks
J. M. Davenport
INVENTOR.
Walter Loomis Hamilton
BY
Webster & Co.
ATTORNEYS.

W. L. HAMILTON.
AUTOMATIC VENDING MACHINE.
APPLICATION FILED AUG. 15, 1911.

1,053,912.

Patented Feb. 18, 1913.

4 SHEETS—SHEET 4.

WITNESSES:
A. C. Fairbanks.
J. M. Davenport.

INVENTOR.
Walter Loomis Hamilton,
BY
Webster & Co.,
ATTORNEYS.

UNITED STATES PATENT OFFICE.

WALTER LOOMIS HAMILTON, OF HOLYOKE, MASSACHUSETTS, ASSIGNOR, BY MESNE ASSIGNMENTS, OF THREE-FIFTHS TO ISABELLE E. HAMILTON, OF HOLYOKE, MASSACHUSETTS, AND TWO-FIFTHS TO ERNEST A. HAMILTON, OF SPRINGFIELD, MASSACHUSETTS.

AUTOMATIC VENDING-MACHINE.

1,053,912.     Specification of Letters Patent.     Patented Feb. 18, 1913.

Application filed August 15, 1911. Serial No. 644,136.

*To all whom it may concern:*

Be it known that I, WALTER LOOMIS HAMILTON, a citizen of the United States of America, residing at Holyoke, in the county of Hampden and State of Massachusetts, have invented a new and useful Automatic Vending-Machine, of which the following is a specification.

My invention relates to improvements in coin-controlled motor-operated vending machines, and resides in certain peculiar feeding and cutting devices for flexible material in strip formation, such devices being adapted to be driven by a motor, and in certain peculiar controlling mechanism for the motor employed to drive said feeding and cutting devices, such mechanism including or being combined with a device which is subject to a coin for action, together with such other auxiliary and subsidiary parts and members as may be required to render practical and give full effect to the aforesaid elements, all as hereinafter set forth.

The objects of my invention are, first, to produce an automatic vending machine which, upon the introduction of a coin therein, delivers from a flexible strip supplied to the machine preferably in the form of a roll a portion of said strip cut to a predetermined length; second, to furnish such a machine with improved coacting feeding and cutting mechanism that is positive and accurate in operation, yet simple in construction; third, to provide reliable and highly efficient controlling mechanism for a motor capable of driving said feeding and cutting mechanism; fourth, to provide practical and serviceable coin-operated mechanism for controlling or releasing the motor-controlling mechanism, and, fifth, to provide a suitable housing or casing for the several elements, which when closed excludes dust and germs and affords protection against the surreptitious withdrawal of the commodity vended and of the coins inserted in the machine.

Other objects will appear in the course of the following description.

This invention is especially well adapted for a paper-towel vending machine, the toweling being supplied to the machine in rolls and short lengths of such toweling, each sufficient to serve as an individual towel, being automatically delivered in exchange for coins of the proper denomination which are deposited in the machine one at a time for that purpose, and said invention is herein illustrated in its application to such a machine.

A practical form of embodiment of the invention (as applied for towel-vending purposes), whereby I attain the objects and secure the advantages of the same, is illustrated in the accompanying drawings, and I will proceed to describe said invention with reference to said drawings, although it is to be understood that the form, construction, arrangement, etc., of the parts in various aspects are not material and may be modified without departure from the spirit of the invention.

Figure 2:
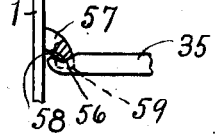
Figure 12:
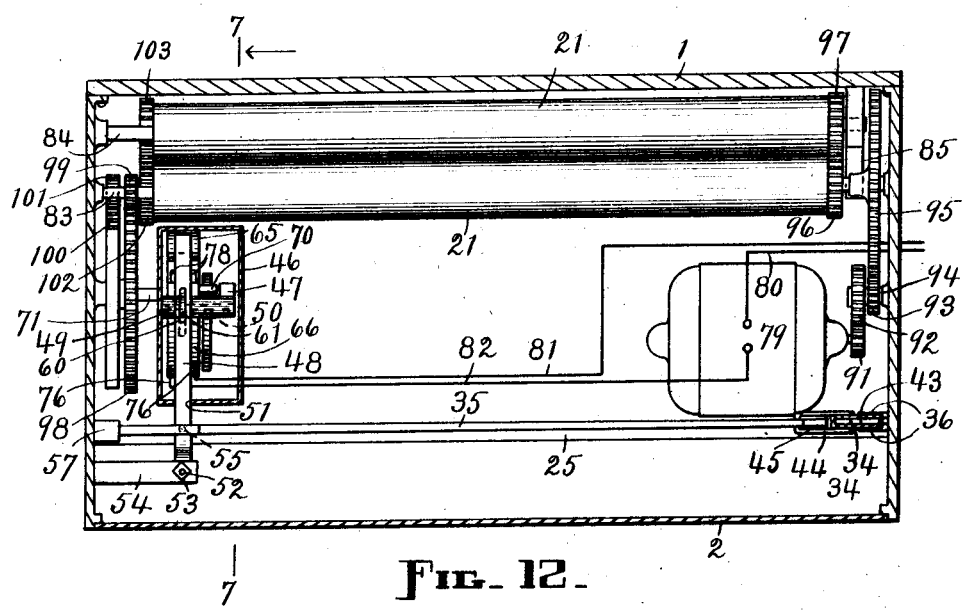
Figure 13:
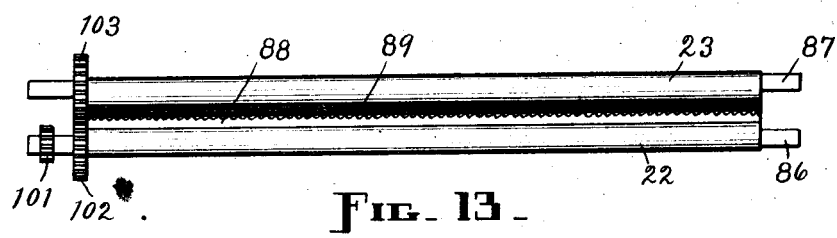
Figure 14:
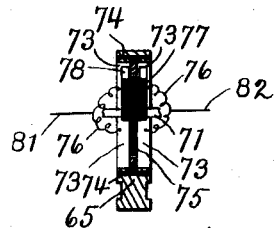

In the drawings, in which like numerals designate like parts throughout the several views, Figure 1 is a front elevation of a paper-towel vending machine, the door of the case being open or rather removed entirely so as to expose to view the interior of said case with its contents; Fig. 2, a fragmentary detail of the fulcrum of or pivotal connection for the coin lever, the pivotal member itself being in partial section; Fig. 3, an interior elevation of the case and contents as viewed from the right-hand end, the case plate at that end having been removed; Fig. 4, a transverse vertical section through the case, taken about on lines 4—4, looking in the direction of the associated arrow, in Fig. 1, and showing the members that are in the right-hand end of the case; Fig. 5, a left-hand end elevation of the feed-rollers and the cutting-rollers, showing the gears and pinions that drive the same; Fig. 6, a transverse vertical section through the machine, on lines 6—6, looking in the direction of the associated arrow, in Fig. 1; Fig. 7, a detail in section taken on lines 7—7, looking in the direction of the associated arrow, in Fig. 12; Fig. 8, a similar detail to that which appears in the preceding view, except that the motor-controlling mechanism is here shown in condition or readiness to start the motor after being released by the coin-operated mechanism or device; Fig. 9, a detail showing said motor-controlling mechanism and the feed-rollers and cutting-rollers in operation, in this view the eccentric is represented in position to elevate the movable section of the switch; Fig. 10, another detail of the same parts and members wherein said movable section is in its elevated position and the cutting-rollers are in the act of severing the paper toweling; Fig. 11, a detail of the latch for said movable section and of part of the operating arm for such latch; Fig. 12, a horizontal section through the machine, on lines 12—12, looking down, in Fig. 1; Fig. 13, a top plan of the cutting-rollers as they appear in Fig. 10, and, Fig. 14, a transverse vertical section through the commutator taken on lines 14—14, looking in the direction of the associated arrow, in Fig. 8.

Other arrows, besides those mentioned above, indicate the directions of moving parts.

As a suitable housing for my machine I provide a case 1 which comprises or is provided with a door 2 and is so shaped and proportioned as to securely inclose in a compact manner the toweling and the mechanism for handling the same. The door 2 constitutes the top, front, and bottom sides of the housing or for the case 1, and the edge of the bottom of said door is hinged in three places, at 3, to the back of said case at the base. At the top of the back of the case 1 is a pair of perforated lugs 5, and the door 2 carries a perforated lug 8 to enter between said lugs 5, when said door is closed, a padlock or other fastening means (not shown) being then employed to lock or secure the door. In the upper part of the door near the right-hand edge is a coin slot 9, and in the bottom of said door near the back edge is a longitudinal towel-delivery slot 10.

Each end of the case 1 is provided on the inside with a U-shaped flange 11, the open end of such flange being at the top, and such case end is further provided with a U-shaped spring 13 having its terminals, which are uppermost, fastened by screws 15—15 to said case end. The two flanges 11 are arranged to receive and form journals or bearings for the ends of a shaft 16, and said flanges have a backward inclination from above downward so as to enable said shaft with its supply of rolled toweling to be introduced without the latter encountering the overhanging parts at the top of the case 1. The shaft 16 does not encounter the springs 13, but the latter are arranged to bear against two collars or hubs 17 mounted, one tight and the other loose, on said shaft, and force said hubs toward each other by actuating the tight hub with the shaft in one direction and the loose hub in the other direction on the shaft, such action being possible because the shaft is shorter than the distance between the ends of the case. The hubs 17 consist in part of inwardly-directed members 18 that are adapted to fit a pasteboard core 19 within a roll 20 of paper-toweling. In the present case, the right-hand hub is secured to the shaft by means of a driving fit, while the left-hand hub is loose on the shaft.

In practice, the roll 20 is slipped onto the shaft 16, while said shaft is out of the case 1 and the loose hub 17 is off of said shaft, then said loose hub is again placed on the shaft, the two hubs are arranged with their members 18 in the ends of the core 19, and the shaft thus equipped with a supply of toweling is inserted at the ends in the open tops of the flanges 11 and moved down to the closed bottoms of said flanges, being forced into position against the resiliency of the springs 13 when said hubs encounter said springs. Thus it will be seen that the ends of the core 19 and of the roll 20 adjacent to such core are grasped between the hubs 17, and that the latter with the springs 13 serve the double purpose of affording the necessary tension for said roll at all times, that is, whether said roll be stationary or in the act of rotating, and of accommodating the supply-holding device to rolls which vary more or less in length. Furthermore, this supply-holding and tensioning device always locates the roll of toweling in the same relative position in the case, regardless of the length of such roll, provided, of course, the roll be not adapted by reason of its extreme length for the machine. The roll 20 is supported directly on the hubs 17 and they in turn on the shaft 16. After all of the toweling on the core 19 has been removed therefrom, the shaft 16 with the hubs 17 and said core are taken from the case 1, a fresh roll with its core is substituted on said shaft for the old core, and the parts are replaced as before.

The toweling passes from the top and back of the roll 20, downward between two horizontal feed-rollers 21 arranged one in front of the other, between horizontal cutting-rollers 22 and 23 arranged below said feed-rollers and with said cutting-roller 22 in front of said cutting-roller 23, to and through a vertical guide 24 which is supported by a horizontal floor 25 in the case 1. The floor 25 is the real floor of the case, although raised some little distance above the bottom of the door 2, it being assumed whenever said door is mentioned that the same is closed unless otherwise stated. As here represented, the back part of the floor 25 or that part that supports the back of the guide 24 is integral with the back of the case 1, while the front portion of said floor or that portion that supports the front of said guide and most of the operating mechanism of the machine besides is upheld at the ends by means of integral lugs 26 bolted at 27 to the ends of said case. The guide 24 is as long as the above-mentioned rollers, and they are long enough to handle the widest strip of toweling which the machine is capable of dispensing. The guide has a flaring mouth at its upper end which opens beneath the cutting-rollers 22 and 23, and said guide opens at the bottom into the slot 10 in the door 2, which slot is of the same size substantially as is the bottom opening of the guide.

At 28 is represented a strip of toweling from the roll 20, to which reference has already been made.

The floor 25 has a coin slot 29 therein, which is under and parallel with the slot 9. Below the floor 25 in front of the guide 24 is a money box 30 open at the top and slidingly supported by end lugs 31—31 on ledges 32—32 on the inside of the ends of the case 1. When the door 2 is open the box 30 can be drawn forward so as to afford access to the contents thereof, or can be removed altogether, but when said door is closed with said box in place the only access to be had thereto is by way of the slot 29 in the floor 25 above. The slot 29 is situated in the floor 25 adjacent to the front side of the box 30. Said front side of the box is interiorly concave, and is provided with a coin-guide flange 33 which extends to the left and downward from the right-hand end of the box. The object of the guide flange 33 is to receive and direct coins, as they drop through the slot 29, into the interior of the box 30, or to cause them to roll away from the vicinity of said slot, otherwise the coins would be liable to pile up beneath the slot and thus clog the entrance to said box. By this construction, a coin in falling or rolling through the slot 29 slides down the front of the box in an inclined position, one side of the coin resting against the concave surface of said box front, alights edgewise on the flange 33, and at once rolls down said flange and said concave surface until the end of the flange is reached, when the coin drops off onto the floor of the box, although it may still continue to roll, but if so its general direction is toward the left-hand back corner of the box or in any event away from the vicinity of the entrance slot.

As connecting mediums between the slot 9, where the coin is introduced into the case, to the slot 29, where the coin escapes into the coin box 30 after doing its work, there are provided an approximately vertical chute 34, a lever 35, and two guide ears 36 which are separated by a space that slightly exceeds the thickness of the coin. In addition to these parts there is also a mouth-piece 38. Two lugs 37, which extend inwardly from the right-hand end of the case 1, support the chute 34, the adjacent edge of said chute being attached to said lugs. The chute 34 is of usual construction, being of a size which permits a coin of the proper denomination to slide freely down the same, and said chute has at its upper end the mouth-piece 38 previously mentioned. The mouth-piece 38 is mounted on a pin 39 that projects inwardly from the adjacent end of the case. This mouth-piece is so hung on the pin 39 and so positioned relative to the slot 9 and to the chute 34, of which it forms a supplementary part, that normally the upper end of said mouth-piece is in open relation to said slot while the bottom end of the front side of said mouth-piece is over the open end of said chute at the top. The purpose of closing the upper end of the chute 34 with the mouth-piece 38 is to prevent manipulation of the mechanism by the introduction into the chute of a wire or a coin attached to a thread with the intention of withdrawing such coin after starting the machine. Owing to the fact that the mouth-piece cannot be positioned so as to leave any considerable portions of the slot 9 and the upper end of the chute open at the same time, any attempt at surreptitiously or fraudulently operating the machine must prove ineffectual. If a proper coin be passed through the slot 9 into the mouth-piece 38, however, the weight of the coin after it gets below the pivotal point 39 causes said mouth-piece to rock forward at the bottom into position to admit the coin to the chute 34 and at the same time to rock rearwardly at the top and close said slot. The coin at once slides down the chute, and as soon as the mouth-piece is relieved from the weight of said coin said mouth-piece returns to former position whereby it closes said chute and opens the slot 9. In order to insure the proper working of the mouth-piece, it is arranged at an incline, the upper end being in advance of the lower end, and it is also counterweighted at 40. A deflecting finger 41, for the coin, rises from the rear edge of the chute 34 at the top, the rear wall of the mouth-piece 38 being slotted at 42 to accommodate said finger. The coin, in sliding down within the mouth-piece strikes the finger or deflector 41, in case said mouth-piece does not swing quickly enough to open the chute, and has a wedging effect that overcomes the inertia of the mouth-piece.

Projecting below the base of the front edge of the chute 34 is a tail-piece 43, and having its ends attached to the sides of the said chute and extending downwardly therefrom is a U-shaped guide 44 for the front terminal of the lever 35. The tail-piece 43 is curved and its arc is concentric with the arc described by the adjacent terminal of the lever 35. The guide 44, between the vertical arms of which the aforesaid lever terminal operates, is of such length and shape and in such position as to enable said lever to make its full stroke in both directions while under the influence of said guide. At the terminal of the lever that is within the guide 44 is a coin-receiver 45, which is open at the top and at the right-hand end, the floor of said receiver being formed by the lever itself and the receiver being closed at its left-hand end. The space for the coin in the receiver 45 is in the same vertical plane and parallel with the space between the ears 36, and the passageway through the chute 34 and the slot 29 are also in said plane and parallel with each other and with the aforesaid spaces. The ears 36 rise from the floor 25 and project inwardly from the right-hand end of the case 1, and they extend a little way over the adjacent edge of the slot 29. This and the opposite end of said slot are beveled downwardly to the left.

It is now clear that the coin, upon entering the chute 34, in the manner previously explained, drops through said chute into the receiver 45, from which latter said coin is prevented from escaping by the tail-piece 43 until the lever 35 is moved downward at its free end low enough to permit the coin to roll out of said receiver under the base of said tail-piece into the space between the ears 36, which it proceeds to do owing to the inclination of said lever at this time. The lever having been swung downward by the coin is now in the position indicated by dot-and-dash lines in Fig. 1, which locates the receiver 45 over and quite close to the slot 29, and in such a position that said receiver can rise without the coin. As soon as the lever carries the receiver upward again, which it next proceeds to do, the slot 29 is uncovered and the coin rolls through the same into the box 30, because the center of gravity of the coin is at the left of the extreme right-hand edge of said slot.

I will next describe how the lever 35 is mounted and the manner in which it operates, it having been assumed in the preceding paragraph that said lever has a vertical swing at its coin-receiver terminal, without going into the matter in detail. Situated on the floor 25 somewhat remote from the left-hand end of the case 1, is a casing 46, and rising from said floor within said casing is an inverted L-shaped bracket 47. The arm at the top of the bracket 47 extends to the left from the upright part of the bracket, and a trip-arm 48 is pivotally mounted, between the left-hand end of said bracket arm and a bearing 49 which extends inwardly from the adjacent side of the casing 46, on a pin 50 which passes through said bracket arm, said trip-arm and said bearing. The trip-arm 48 passes out through a slot 51 in the front side of the casing 46, and the front terminal of said arm is bent downwardly and then forwardly to have attached thereto the lower end of a coiled spring 52. The upper end of the spring 52 is adjustably fastened by nuts 53 to an inwardly-extending lug 54 on the adjacent end of the case 1. The lever 35, which is nearly as long as the case 1, is pivotally mounted at 55, a short distance from its left-hand end, on the trip-arm 48 outside of the casing 46, and the aforesaid end of the lever is fulcrumed beneath and against a bearing edge 56 on the underside at the inner end of a lug 57, said lever having a transverse notch 58 in the top to receive said bearing edge. The lever 35 and the trip-arm 48 are arranged at right-angles to each other. The lug 57 projects inwardly from the left-hand end of the case 1, and is provided with two ears 59 that extend below the ends of the bearing edge 56 to receive between them the fulcrumed end of the lever 35 and prevent the same from moving laterally out of engagement with said bearing edge. That portion of the trip-arm 48 that is mounted directly on the pivot 50 is slotted longitudinally at 60, and set in such slot and mounted on said pivot is a latch 61 for a switch consisting in part of a movable segment or section which latter said latch is designed to hold and release. The latch 61 has a hook 62 on the bottom edge behind the pivot 50, and a stop projection 63 which extends in front of said pivot and under the adjacent part of the trip-arm 48 which is cut away to accommodate such stop projection. The latch 61 projects behind the hook 62, and being thus counterweighted normally hangs with the stop projection 63 up against the trip-arm 48. The trip-arm projects rearwardly over the latch and is counterweighted at 64 for the reason presently to be given. There is clearance enough between the latch and the overhanging terminal of the trip-arm to enable said latch to function properly.

A switch frame 65 is secured to the floor 25 within the casing 46 and under the latch 61, and such frame is provided with a movable segment 66 which is pivoted at its lower end in front to the front end of said frame, at 67, and has a tooth or hook 68 on top for engagement with the latch hook 62. When closed the segment 66 bears with its upper rear end on the corresponding end of the frame 65, closing the gap between such ends, and when opened said segment is swung upward, and its hook 68 encounters the hook 62 and rocks the latch 61 upwardly out of the way until said hook 68 passes said hook 62, when said latch rocks down into normal position again with its hook now behind the hook 68. The segment 66 is in this manner held up by the latch until a coin drops into the receiver 45, then the lever 35 is swung downward on the point of fulcrum, by said coin, and carries with it the trip-arm 48 against the resiliency of the spring 52, and said arm thus rocked on the pivot 50 actuates the latch 61, through the medium of the stop projection 63, and raises the hook 62 so that said hook becomes disengaged from the hook 68 and said segment is released and permitted to drop and close the gap in the switch.

The lever 35 is light, the spring 52 is properly adjusted, and said lever and the trip-arm 48 with the latch 61 are nicely balanced, to the end that the weight of a coin falling into the receiver 45 is sufficient to overcome the force of the spring and of frictional and other resistance, upset the balance, and bring about the release of the segment 66. When the lever 35 is released by the coin or relieved from the weight thereof, the spring 52 asserts itself and elevates the trip-arm 48 and with said trip-arm said lever. The force of the spring 52 becomes weaker, of course, as the trip-arm and the lever approach the ends of their upward travel, said spring having expended much of its energy before such ends are reached, but the combined weight of the latch and trip-arm behind the pivot 50, which has been of some assistance to the spring from the start, now furnishes enough added power, owing to the new positions which the parts have already assumed, to bring about the complete restoration to normal positions and conditions of the parts being considered. By thus making use of a spring and counterweights and arranging them in the manner explained, the operation of the lever 35 by the coin is enhanced, because an opportunity is afforded for the coin to start said lever on its downward course before meeting with the full resistance of the spring, such resistance subsequently being overcome by the momentum of the lever due to the weight of the coin.

The segment 66 is actuated upward into engaging relation with the latch 61 by means of an eccentric 69 and a lug 70 which projects to the right, from the top of said segment, over said eccentric. The latter is fast on a shaft 71 which is journaled in the upright part of the bracket 47 and in the adjacent end of the case 1 after passing through the intervening side of the casing 46. In Fig. 7 the segment 66 is represented as being held up by the latch 61, and said segment is thus held in the general views, also in Fig. 10. In Fig. 8 the parts have been actuated to release the segment which is in its low or closed position, and in Fig. 9 the eccentric 69 is in the act of raising said segment into locking engagement with the latch, the operation having been completed in the next view. As clearly shown, the eccentric raises the segment when the high part of the periphery of said eccentric passes under the lug 70, the members being so proportioned and positioned that the eccentric encounters said lug only at the time it is required that the segment be swung upwardly on the pivot 67.

A bow spring 72 is attached at the base to the frame 65 below the pivot 67, and extends upwardly to bear against the front of the segment 66 above said pivot and force said segment toward the upper back end of said frame or retain it in locking engagement with the latch 61. The contiguous faces of the hooks 62 and 68 are so arranged that very little power is required to overcome the force of the spring 72 and unlock the parts when the latch 61 is tilted upward by the trip-arm 48.

The switch, in addition to the frame 65 with its movable segment 66, comprises two pairs of metal contact pieces 73 fitted within said frame and segment, one pair in each, and separated from the frame and segment by segmental insulators 74, one such insulator being interposed between the frame and the pair of contact pieces therein, and the other such insulator being interposed between the segment and the pair of contact pieces provided for the same. The contact pieces 73 in each pair are separated from each other by a segmental insulator 75, there being such an insulator for the frame 65 and another for the segment 66. When the segment with its contact pieces 73 and insulators 74 and 75 is closed, not only does the frame 65 with its segment form a complete ring or annulus, but the two insulators 74, the two pairs of contact pieces, and the two insulators 75 do the same thing. The contact pieces 73 on each side of the insulators 75 are connected by a wire or jumper 76 so as to insure a continuity of circuit at the joint adjacent to the pivot 67, whether the segment 66 be open or closed.

The shaft 71 marks the axial center of the switch annulus, and fast on said shaft inside of such annulus is an arm 77 of insulating material and provided at its outer end with a bifurcated brush 78 of spring metal designed to contact forcibly with the contact pieces 73 and to travel around practically the entire course of their inner faces, one branch of said brush traveling around the two contact pieces on one side of the insulators 75 and the other branch of said brush traveling around the two contact pieces on the other side of said insulators. The space between the branches of the brush 78 enables said brush to clear the insulators 75. Inasmuch as the brush 78 is insulated, when the same is in contact with the contact pieces 73, which are themselves insulated, the dead space is bridged and a circuit formed from the contact piece on one side with which said brush is in engagement to the contact piece on the other side with which said brush is in engagement, and the jumpers 76 connect electrically the two contact pieces on the two sides.

Referring again to Fig. 7, it will be observed that the brush 78 is in the space between the upraised end of the segment 66 and the adjacent end of the frame 65, consequently out of contact with the contact pieces 73. Here, then, as in the general views, the circuit is broken at the switch. Passing to the next view, it will be seen that the segment 66 is down on the brush 78, hence the circuit at the switch is closed, and it remains closed while said brush makes one complete revolution and until said brush rides clear of the frame contact pieces into the space left by the segment when swung upwardly by the eccentric 69. In Figs. 9 and 10 the brush is shown at two different points in its revolution. An electric motor 79 is supported on the floor 25 adjacent to the right-hand end of the case 1. This motor when energized drives the feed-rollers 21 and the cutting-rollers 22 and 23. The motor 79 is in an electric circuit made up of a wire 80 which connects said motor with a suitable source of electrical energy outside of the case 1 and enters said case, with a wire 81, through the right-hand end thereof, a wire 82 which connects one of the jumpers 76 with said motor, and said wire 81 which connects the other jumper 76 with said source of electrical energy, together with said jumpers, the contact pieces 73 and the brush 78.

Before going more fully into detail in regard to the electric devices. I will take up the motor-driven elements, commencing with the feeding mechanism, then passing to the cutting mechanism, and finally to the transmission mechanism. The feed-rollers 21 are merely contacting rollers of usual construction for flexible strip-actuating purposes. The front feed-roller 21 is mounted fast on a shaft 83 that is journaled at opposite ends in suitable bearings which project inwardly from the ends of the case 1. The rear feed-roller 21 is mounted fast on a shaft 84 that is journaled at the left-hand end in a bearing which projects inwardly from the corresponding end of the case 1, and at the right-hand end in a bracket 85 which projects inwardly from the back side of said case. The cutting-rollers 22 and 23 are respectively mounted fast on shafts 86 and 87 that are journaled in the same way as the shaft 84 is journaled. The cutting-rollers are mutilated in a similar manner by having nearly one-half of each omitted throughout the entire length. By thus constructing the aforesaid rollers and properly mounting them relatively on the shafts 86 and 87 provision is made for gripping the paper strip 28, as represented in Fig. 10, and for leaving a clear space between them for said strip, as represented in most of the other views where the cutting-rollers appear. The cutting-roller 22 is equipped with a longitudinal knife, blade or cutter 88 that projects from the full periphery or high part of said roller, about one-fourth of the distance from one longitudinal edge of said high part to the opposite corresponding edge, and stands at an angle to the radius with which its cutting edge coincides and when in cutting position, as in Fig. 10, above such radius. The cutting-roller 23 has a longitudinal groove 89, in the periphery of its high part, to afford clearance for the cutter 88 when the cutting-rollers revolve. The motor 79 has a shaft 90 with a pinion 91 thereon. The pinion 91 meshes with a gear 92 which is rigidly connected with a pinion 93. The gear 92 and the pinion 93 are loosely mounted on a stud 94 which projects inwardly from the adjacent end of the case 1. The pinion 93 meshes with a large gear 95 fast on the shaft 83. Also fast on the shaft 83 is a gear 96 that meshes with a gear 97 of the same size on the shaft 84. Thus the feed rollers 21 are driven, at the proper uniform speed and in the direction to actuate the strip 28 downward, from the motor and through the medium of the aforesaid pinions and gears. Mounted fast on the shaft 71, between the casing 46 and the adjacent end of the case 1, is a large gear 98 which is driven by a meshing pinion 99 fast on the adjacent terminal of the shaft 83, and a large segmental gear 100 which imparts but one revolution to the cutting-roller 22 and 23 while the feed-rollers 21 are making some half dozen revolutions, more or less. The segmental gear 100 drives the cutting-roller 22 directly by means of a pinion 101 fast on the shaft 86, with which said gear meshes, and the cutting-roller 23 receives the same motion, only in the opposite direction, at the same rate of speed through the medium of a gear 102 fast on said shaft and a meshing gear 103 of the same size on the shaft 87. The same means that drives the gear 98 also drives the brush arm 77, since both said gear and arm are fast on the same shaft 71. The actuating mechanism is so timed that the cutting-rollers are driven a little faster than the feed-rollers. The purpose of this is to strain the toweling strip 28 while it is in the grasp of the two pairs of rollers, and thus facilitate the cutting action of the cutter or blade 88 on said strip, it being at that time, that is, while the strip is in the grasp of the bottom as well as the top rollers, that said blade comes into play.

Having so fully described the several elements and features of my machine, more than a brief explanation of the operation of the same as a whole is not necessary. Such explanation follows, it being assumed that the machine is supplied with paper toweling and all ready for action. A coin is dropped through the slot 9 into the mouth-piece 38 and quickly escapes from the latter into the chute 34 and thence into the coin-receiver 45. The lever 35 is swung downward by the coin in the receiver 45, when said coin rolls out into the space between the ears 36 and from there through the slot 29 into the box 30. When depressed the lever 35 actuates the trip-arm 48 and causes the latch 61 to release the segment 66. The latter instantly snaps into its closed position, under the influence of the spring 72, and brings the upper pair of contact pieces 73 down onto the brush 78. This closes the circuit and the motor 79 is started. Meanwhile the lever 35 rises with the trip-arm 48, under the influence of the spring 52 and the counterweights or counterweighted parts into the former position, in readiness for the next coin, and at the same time the latch 61 is swung down to again locate the hook 62 in the path of the hook 68 when the segment 66 is subsequently elevated by the eccentric 69. The toweling strip 28 is always in the grasp of the feed-rollers 21, but at this time hangs freely in the space between the low parts of the cutting-rollers 22 and 23, because said cutting-rollers are disposed with their high parts outwardly—see Figs. 7 and 8. Upon the closing of the circuit and the starting of the motor, the feed-rollers are set in motion and continue to revolve until said motor stops, and while thus revolving said rollers draw off more and more of the strip 28 from the roll 20. By the time enough of the paper strip is fed down through the guide 24 and the slot 10, for a towel the length of which is calculated from the cutting line to the bottom edge, said strip is severed by the following means and in the following manner. As the gear 98 approaches the end of its revolution, the segmental gear 100 engages the pinion 101 and thus causes the cutting-rollers to be set in motion, such motion being a little accelerated as compared to the motion of the feed-rollers so as to strain slightly the strip 28 which is now grasped between the high parts of said cutting-rollers as well as between said feed-rollers; and before said segmental gear leaves said pinion said cutting-rollers make a revolution and while making it not only grip said strip as noted, but project the cutter 88 against the strip while under tension and by this means severing the same between said rollers and above the bite thereof. In Fig. 9, the cutting-rollers are represented as they appear directly after being started, and in Fig. 10, said rollers are represented as they appear in the act of cutting the paper strip. After severing the strip 28, the cutter 88 continues its travel and moves down, passing through the groove 89 on the way, into the position which it occupies in either of Figs. 7 and 8, this last being the position of said cutter when and while the cutting-rollers are idle. The towel cut from the strip 28 is fed down and released by the cutting-rollers before they complete their revolution, or as soon as the low parts of said rollers come or begin to come opposite to each other. At the next cycle of the machine a towel of the same length is cut off by the same means and in the same manner, and so on until the supply roll 20 is exhausted, when a fresh supply roll is put in its place. While the strip-manipulating rollers are measuring off, as it were, and severing the towel, the brush 78 is making the circuit of the switch, and when said brush arrives at the upper rear end of the frame 65 and slips off of the same into the open space left by the segment 66 which is elevated just before this time into engaging relation with the latch 61, by the eccentric 69, the electric circuit is opened and the motor with all of the members driven thereby stops.

The above-described cycle of the machine may be repeated indefinitely.

It is quite possible that the motor will not stop on the instant the circuit is broken, in which case the feed-rollers will continue to feed down more paper, but in no event will there be a sufficient amount of this kind of movement to draw off any considerable amount of paper, hence the bottom end of the unsevered strip always is situated too high in the guide 24 (if not above such guide) to be reached through the slot 10, and even if the paper could be reached through said slot it could not be dragged from between the feed-rollers, so that only a comparatively small fragment torn off below said rollers would be obtained.

In the first view portions of the toweling roller 20 and its core 19 are broken away to show one of the hub projections 18 in full and the switch casing 46 is in section.

What I claim as my invention, and desire to secure by Letters Patent, is—

1. In a flexible strip handling machine, means to supply a strip, feeding mechanism for such strip, an electric motor, driving means between said motor and said mechanism, an electrical circuit for such motor, a switch and brush in such circuit, means for closing said circuit through said switch and brush, cutting mechanism for such strip, and a train of gears between said feeding and cutting mechanisms, such train of gears including a segmental gear.

2. In a flexible strip handling machine, means to supply a strip, feeding mechanism for such strip, an electric motor, driving means between said motor and said mechanism, an electrical circuit for such motor, a switch and brush in such circuit, cutting mechanism for such strip, and means to drive said brush and said cutting mechanism from said feeding mechanism.

3. In a flexible strip handling machine, means to supply a strip, feeding mechanism for such strip, an electric motor, driving means between said motor and said mechanism, an electrical circuit for such motor, a switch and brush in such circuit, a holding and releasing lever for controlling said switch, cutting mechanism for such strip, and means driven from said feeding mechanism to drive said cutting mechanism and to reset said switch and lever after the latter has released the former.

4. In a vending machine, a suitable case provided with bearing members and tension springs at the ends, a shaft journaled loosely in said bearing members so that it can move longitudinally, and roll-supporting hubs mounted on said shaft between said springs, one of such hubs being loose on said shaft.

5. Roll-supporting means, for a vending machine, comprising a suitable case provided with bearing flanges and tension springs at the ends, a shaft journaled for longitudinal movement in said flanges, and hubs adapted to fit into and against the ends of a roll, one of such hubs being fast on said shaft and the other loose thereon and the two with such roll mounted on and between them being receivable between said springs.

6. The combination, in a vending machine, of feeding and cutting mechanism, an electric motor, an electrical circuit for such motor, a switch and a brush in such circuit, such switch having a part which is movable relative to the path of said brush, means to actuate said part out of such path, means to transmit motion from said motor to said mechanism, brush and actuating means for said movable part of the switch, and means to permit said movable part to return to said path.

7. Feeding and cutting mechanism, for a flexible strip, comprising a pair of constantly contacting rollers, means to drive said rollers a pair of cutting-edge-provided intermittently contacting rollers, and means to actuate said last mentioned rollers from said first-mentioned rollers intermittently relative to the latter.

8. Feeding and cutting mechanism, for a flexible strip, comprising a pair of constantly contacting rollers, a pair of cutting-edge-provided intermittently contacting rollers, and means to actuate said intermittently contacting rollers faster than said constantly contacting rollers.

9. Feeding and cutting mechanism, for a flexible strip, comprising a pair of constantly contacting rollers, a pair of cutting-edge-provided intermittently contacting rollers, and means to actuate said constantly contacting rollers and to actuate said intermittently contacting rollers intermittently relative to the actuation of the first-mentioned rollers.

10. The combination, in a vending machine, with a suitable case provided with supporting means for a flexible-strip supply, of a pair of constantly contacting feed-rollers mounted within such case in position to receive a strip from the supply, a pair of intermittently contacting cutting-rollers mounted within such case adjacent to said feed-rollers, and operating mechanism for said rollers, said mechanism being capable of driving said feed-rollers for a predetermined length of time and said cutting-rollers for a predetermined length of time which is shorter than the first-mentioned period.

11. The combination, in a vending machine, with a suitable case provided with supporting means for a flexible-strip supply, of a pair of constantly contacting feed-rollers mounted within such case in position to receive a strip from the supply, a pair of intermittently contacting cutting-rollers mounted within such case adjacent to said feed-rollers, and operating mechanism for said rollers, said mechanism being capable of driving said feed-rollers for a predetermined length of time and said cutting rollers for a predetermined length of time which is shorter than the first-mentioned period, and of driving said cutting rollers faster than said feed rollers.

12. The combination, in a vending machine, with a pair of suitably-mounted constantly-contacting revoluble feed-rollers, of a pair of suitably-mounted intermittently-contacting revoluble cutting-rollers, one of such cutting rollers being provided with a cutter which projects from the high part thereof, and the other of such cutting-rollers having a groove in its high part to accommodate said cutter when said cutting-rollers revolve, said cutting-rollers coacting with said feed-rollers during a part of the revolution of the cutting-rollers.

WALTER LOOMIS HAMILTON.

Witnesses:
F. A. CUTTER,
A. C. FAIRBANKS.